US011237816B2

(12) United States Patent
Balogh et al.

(10) Patent No.: US 11,237,816 B2
(45) Date of Patent: Feb. 1, 2022

(54) METHOD FOR REMOTE ONLINE SOFTWARE UPDATE IN MOTOR VEHICLES

(71) Applicants: thyssenkrupp Presta AG, Eschen (LI); thyssenkrupp AG, Essen (DE)

(72) Inventors: András Balogh, Tordas (HU); Ernó Varga, Budapest (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 16/643,889

(22) PCT Filed: Sep. 25, 2017

(86) PCT No.: PCT/EP2017/074221

§ 371 (c)(1),
(2) Date: Mar. 3, 2020

(87) PCT Pub. No.: WO2019/057312

PCT Pub. Date: Mar. 28, 2019

(65) Prior Publication Data

US 2020/0272448 A1 Aug. 27, 2020

(51) Int. Cl.

*G06F 8/65* (2018.01)
*G06F 8/71* (2018.01)
*G07C 5/00* (2006.01)

(52) U.S. Cl.

CPC .................. *G06F 8/65* (2013.01); *G06F 8/71* (2013.01); *G07C 5/008* (2013.01)

(58) Field of Classification Search

CPC .................................... G06F 9/44; G06F 8/65
See application file for complete search history.

(56) References Cited

U.S. PATENT DOCUMENTS

| | | | | |
|---|---|---|---|---|
| 5,008,814 | A * | 4/1991 | Mathur | G06F 8/65 709/219 |
| 6,742,113 | B1 * | 5/2004 | Yamada | G06F 9/322 711/220 |
| 10,268,206 | B2 * | 4/2019 | Yamamura | G05D 1/0225 |
| 2007/0055422 | A1 * | 3/2007 | Anzai | G07C 5/0858 701/32.1 |
| 2011/0197187 | A1 | 8/2011 | Roh | |

(Continued)

OTHER PUBLICATIONS

International Search Report issued in PCT/EP2017/074221, dated Jan. 12, 2018.

(Continued)

*Primary Examiner* — Jae U Jeon
(74) *Attorney, Agent, or Firm* — thyssenkrupp North America, LLC

(57) ABSTRACT

A method can be employed to provide a remote online software update to a motor vehicle. The motor vehicle may have an ECU with an MCU having an internal memory, and with an external memory that is located outside the MCU and is configured to communicate with the MCU via a communication link. The method may involve starting to download a new software version, storing the new software version in the external memory, and once the new software version is fully downloaded deleting the software version running on the MCU and programming the new software version from the external memory.

2 Claims, 1 Drawing Sheet

(56) References Cited

U.S. PATENT DOCUMENTS

2015/0007155 A1 1/2015 Hoffman
2017/0242678 A1* 8/2017 Sangameswaran ....... G06F 8/65

OTHER PUBLICATIONS

Paul Hammond et al., "Data Consistency Checks—Several People are Coding", Jul. 27, 2016, (https://slack.engineering/data-consistency-checks-e73261318f96).
Boehm B. W., "Verifying and Validating Software Requirements and Design Specifications", IEEE Software, Institute of Electrical and Electronics Engineers, US, vol. 1, No. 1, Jan. 1, 1984.
General Principles of Software Validation; Final Guidance for Industry and FDA Staff by U.S. Department Of Health and Human Services, Food and Drug Administration, Center for Devices and Radiological Health, and Center for Biologies Evaluation and Research, pp. 1-47, Jan. 11, 2002.

* cited by examiner

METHOD FOR REMOTE ONLINE SOFTWARE UPDATE IN MOTOR VEHICLES

CROSS REFERENCE TO RELATED APPLICATION

This application is a U.S. National Stage Entry of International Patent Application Serial Number PCT/EP2017/074221, filed Sep. 25, 2017, the entire content which is incorporated herein by reference.

FIELD

The present disclosure generally relates to hardware and methods for providing remote online software updates to motor vehicles.

BACKGROUND

Motor vehicle electronic control units (ECU) include microprocessors (MCU), which monitor information from inputs such as sensors and make decision based on their program, then output signals to actuators and electrical devices in the motor vehicle. Microprocessors control and monitor most electrical systems on a vehicle, e.g. engine, transmission, suspension, brakes, steering and main body control functions. It is not unusual for the MCU on a vehicle to require programming updates. Updating is performed by reflashing or reprogramming of the memory in the microprocessors with an update supplied by the manufacturer. This updating of software is especially critical in vehicles for which remote online updating is planned. In this case, the vehicle is receiving the software update while driving, and is expected to do the software update during parking. In conventional motor vehicles the software update process starts with the deletion of the current software running on the ECU. After that the new software is downloaded and programmed in a non-volatile memory of the microcontroller. In case of any transient problem during reprogramming, the ECU remains in a non-functional state, as the previous software has already been deleted and the new one has not been successfully flashed yet. In this case the ECU is running a so-called bootloader that is able to receive the new software image. However to receive the new software image, the other side (service equipment) has to be able to retry the programming session. A disadvantage is that this is not always working, and that it requires significant time. The ECU cannot be brought online until a final successful software download is achieved.

Remote online updating is particularly difficult, because it is impossible to do several retry runs and it is probable that the update process will be aborted due to e.g. loss of connection etc.

Thus a need exists for a robust method and hardware for providing remote online software updates to motor vehicles.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a method for remote online software update for motor vehicles is provided, said motor vehicles having an ECU with a MCU having an internal memory and with an external memory, which is located outside of the MCU said method comprising the steps of:

a) Starting download of a new software version;

b) Storing of said new software version in said external memory;

c) If said new software version is fully downloaded, deletion of the software version running on said MCU and programming of the new software version from the external memory to the internal memory.

The external memory allows robust software update, because the running software is kept until the new software version is fully downloaded.

Preferably, said new software version is checked for consistency after download.

In a preferred embodiment, the method further comprises:

d) Checking the version of the software stored in the external memory;

e) If the version of the software is newer than the running software version, validating said new software version in said external memory.

Preferably, said external memory is a non-volatile-memory device.

Further, a motor vehicle ECU with a MCU comprising an internal memory is provided, wherein the ECU comprises an external memory, which is located outside of the MCU and which is designed to communicate with the MCU via a communication link, wherein said communication link allows the MCU to store a software during download onto the external memory. It is advantageous, if said external memory is a non-volatile-memory device.

Figure 1:
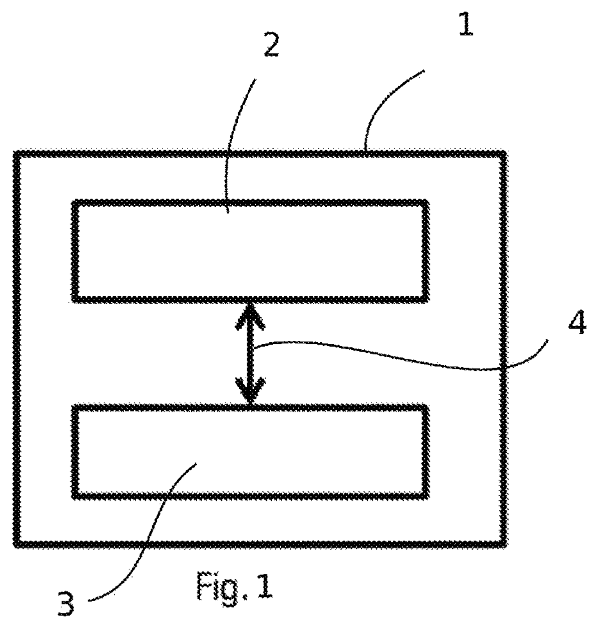
FIG. 1 is a schematic view of example hardware structure.

FIG. 1 schematically shows a hardware structure of the ECU 1 with a MCU 2 and an additional external memory 3 (non-volatile-memory device), in which the MCU 2 can store a new version of the running software during download. The MCU 2 and the external memory 3 communicate via a communication link 4. If the download process aborts, the MCU 2 will still contain the running software version, which can be used continuously. If the new software version is fully downloaded and passes a consistency check, the MCU 2 deletes the running software version and programs the new one from the external memory 3 in its internal memory. If this process aborts (e.g. because loss of power, etc.), it can be restarted any time. This process is advantageous, because it only requires little time.

Figure 2:
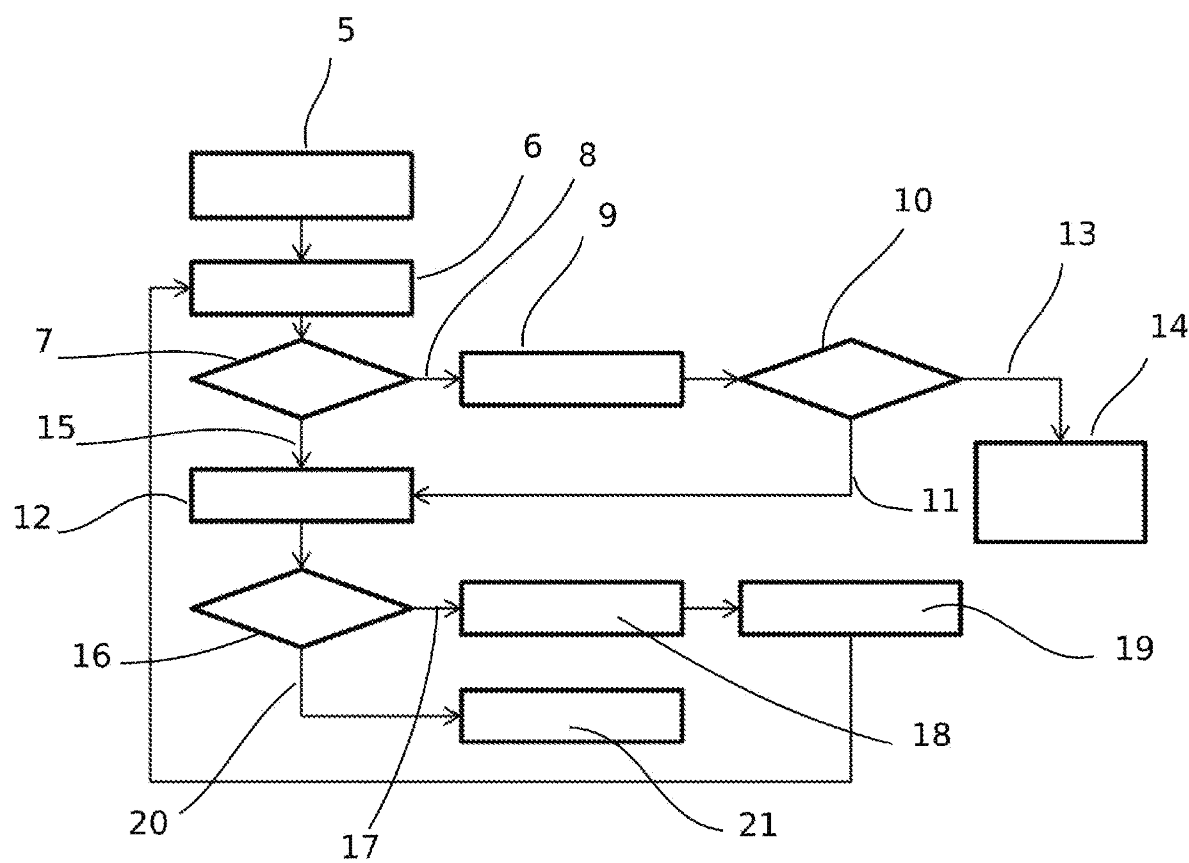
FIG. 2 is a flow chart depicting an example software update.

FIG. 2 depicts the process flow of software update. After the start of the MCU 5 the software is validated in the internal memory of the MCU 6. After validation of the software in the internal memory 6, it is checked whether the software is valid or not 7. If the software is valid 8, the version of the software in the external memory is checked 9 and it is checked whether the software in the external memory is newer or not 10. If the software in the external memory is newer then the validated software in the internal memory 11, the software is validated in the external memory 12. If the software in the external memory is older 13, the validated software is started 14 in the internal memory. If the software in the internal memory is not valid 15, the software is validated in the external memory 12. After validation of the software in the external memory 12, it is checked whether the software is valid or not 16. If the software is valid 17, the internal memory is deleted 18 and the new software version of the external memory is programmed to the internal memory 19. In a next step, the software is validated in the internal memory of the MCU 6. But if the software is invalid 20, a bootloader is started from the internal memory 21.

What is claimed is:

1. A method for providing a remote online software update to a motor vehicle, wherein the motor vehicle comprises an electronic control unit (ECU) with a microprocessor (MCU) having an internal memory and with an external memory that is located outside the MCU and is configured to communicate with the MCU via a communication link, the method comprising:

starting to download a new software version;

storing the new software version in the external memory;

once the new software version is fully downloaded, checking the new software version stored in the external memory for consistency;

validating the new software version in the external memory if the new software version is newer than the software version running on the MCU; and deleting a software version running on the MCU and programming the new software version from the external memory to the internal memory after the consistency check and after the validation of the new software version, wherein the external memory is a non-volatile-memory device.

2. A motor vehicle electronic control unit (ECU) comprising: a microprocessor (MCU) that includes an internal memory; and an external memory that is located outside the MCU and is configured to communicate with the MCU via a communication link, wherein the communication link allows the MCU to store software during download onto the external memory, wherein the motor vehicle ECU is configured to perform the method of claim 1.

* * * * *